FIG. 7 Absolute value instruction
(Increment instruction

| N | | X | Y | Others | CR,BS |
|---|---|---|---|---|---|
| N001 | | X+100.00 | Y+100.00 | | CR |
| N002 | I80 | X+20.00 | | | BS |
| N003 | | X+100.00 | Y+50.00 | | CR |
| N004 | I40 | X+12.00 | | | CR |
| | | X+28.00 | | | BS |

United States Patent Office 3,531,630
Patented Sept. 29, 1970

3,531,630
NUMERICAL CONTROL DEVICE
Yasumasa Narikiyo, Nagoya, and Yutaka Maeda, Aichi-ken, Japan, assignors to Okuma Machinery Works, Ltd., Nagoya, Japan, a corporation of Japan
Filed Dec. 30, 1966, Ser. No. 606,269
Claims priority, application Japan, Jan. 12, 1966, 41/1,928
Int. Cl. G06f 15/46
U.S. Cl. 235—151.11                            1 Claim

ABSTRACT OF THE DISCLOSURE

The invention relates to a positioning control device in which is provided a selective switching of two modes of control, an absolute value instruction system and an increment instruction system. In operation, a value of absolute value instruction, a value of increment instruction and an increment instruction signal are stored in an instruction tape, the device being automatically switched to the absolute value system or to the increment instruction system depending on the presence or absence of the increment instruction signal.

---

This invention relates to a positioning control device for use in a machine, and more particularly to positioning control of a table, cutter, etc. of a machine tool.

In a conventional way of positioning control applied so far, there have been two different types of instruction systems, that is, an absolute value instruction system and increment instruction system. The positioning control device manufactured so far has employed either one of these two types of instruction systems. Normally there are two types of positioning control systems, the positioning at equal intervals and the positioning at unequal intervals, and these two modes of control are mixed up in most of the control devices now available. This makes the control system inconvenient because an instruction tape will become too long whichever mode of control is employed. Furthermore, in case of a positioning control repetition of positioning at equal intervals or similar type of control, all the repetition cycles of control were normally recorded in the tape as instruction information in each of these two types of control systems used so far, hence and the length of the tape had to be considerably long.

An object of the instant invention is, therefore, to eliminate the inconvenience mentioned above by means of selective switching of the two modes of control when instructing the machine, thus making it possible to use only one control device for two modes of control. A further object of the instant invention is to provide a control device using an improved instruction tape of a length considerably shorter than conventional one by storing only information of a predetermined interval and number of times of repetition required in place of storing all the repetitive instructions in the tape when repetition of positioning at equal intervals is included in the process.

A typical embodiment of the present invention will now be described by way of example with reference to the accompanying drawings, in which:

FIG. 7 is a program sheet of the positioning control of FIG. 6.

Figure 1:
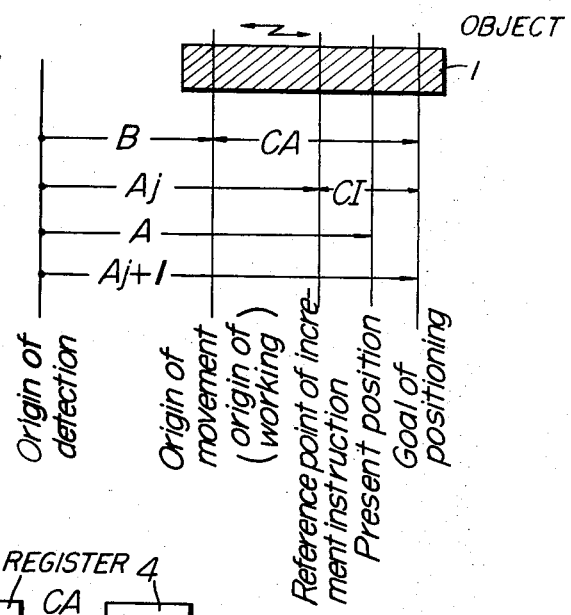
FIG. 1 is a diagram for defining various operands.

In the accompanying drawings, numeral 1 represents an object to be controlled such as a table or tool, 2, 5, 8, and 13 are conventional arithmetic operation circuits composed of logical elements such as NOR, NAND, AND and OR circuits for carrying out addition or subtraction of binary, binary coded decimal tnd decimal numbers, 3, 6 and 16 are conventional registers employing shift registers or delay lines for temporarily storing instructed values and calculated values, 4, 7, 10 and 18 are tape readers, of which 10 and 18 are capable of causing forward and backward movements of the tape, 9 and 15 are conventional counters for counting the number of time of repetition of incremental instruction, 11 and 19 are decision circuits composed of logical elements such as NOR, NAND, AND and OR circuits and operative at the time of incremental instruction for deciding whether the tape is to be advanced or retreated according to whether or not the instructed number of time of repetition and the result of calculation of counted numbers are coincident, and 12, 14 and 17 are conventional switching circuits. These operation circuits, registers, counters, decision circuits, and switching circuits are supplied with timing pulses for time sharing operation. Referring now to FIG. 1 A represents a detected absolute value of a present position with respect to the origin of detection, B is a movement of the origin, CI is a value of the increment instruction, $A_j$ represents an absolute value of a position which is a reference point of the increment instruction with respect to the origin of the detection, $A_{j+1}$ is an absolute value of a goal point with respect to the origin of the detection, and CA is a value of the absolute value instruction. Then, CI is in the relation $$CI = A_{j+1} - A_j$$

and since the reference point of the increment instruction moves at each instruction, the next reference point is at $A_{j+1}$.

Figure 2:
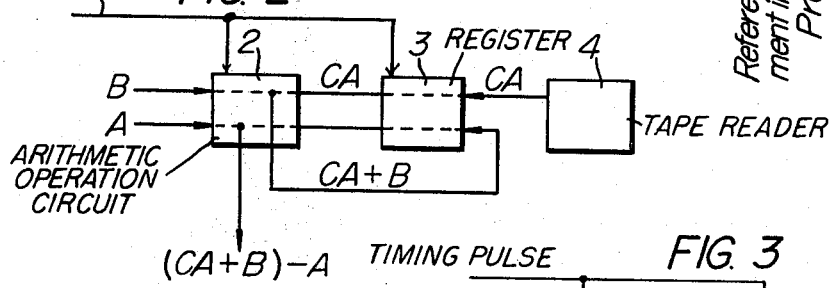
FIG. 2 is a block diagram of an arithmetic operation circuit for an absolute value instruction system.
Figure 3:
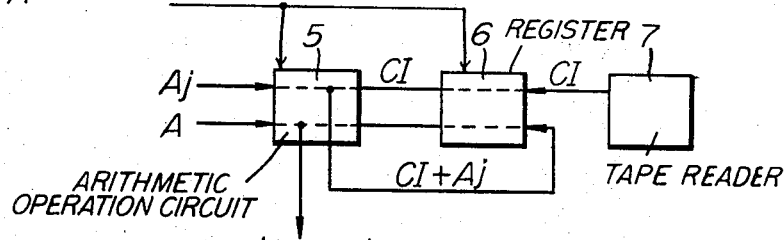
FIG. 3 is a block diagram of an arithmetic operation circuit for an increment instruction system.

Referring to FIG. 2 in which an absolute value instruction system is illustrated, a value CA of the absolute value instruction read out by the tape reader 4 is once stored in the register 3 at the time determined by a timing pulse. Next, the first arithmetic operation is carried out at the time determined by a timing pulse in the arithmetic operation circuit 2 by adding the registered value CA to the amount of the movement of the origin B. The result of this operation is again stored in the register 3. This operation is performed while the table is in a stationary state, and is not repeated until the positioning operation is completed. The next step of operation is to subtract the absolute value A detected at the present position with respect to the origin of the detection from the registered value $(CA+B)$ at the time determined by a timing pulse in the operation circuit 2 to drive the object in accordance with the result of this operation. Similar subtractions are successively performed until the termination of the positioning operation, i.e., until the result of the subtraction becomes zero. Expressing the above operations, we get:

$CA+B$—1st operation
$(CA+B)-A$—2nd and succeeding operations untill completion of positioning Referring now to FIG. 3, in which an increment instruction system is shown, an increment instruction value CI read out by the tape reader 7 is once stored in the register 6 in the same manner as the operation of FIG. 2. Then the absolute value $A_j$ of the position of the reference point of the increment instruction with respect to the origin of detection is added to the value stored in the register CI by means of the arithmetic operation circuit 5, and the result of the operation is again stored in the register 6. The second operation is carried out by subtracting a detected value of the absolute value A of the present position with respect to the origin of the detection from the value in the register $CI+A_j$. Similar subtractions are successively performed until the object to be controlled reaches the destination after successive movements, i.e. until the result of the subtractions becomes zero. Expressing the above operation in the form of formula, we get:

$CI+A_j$—1st operation
$(CI+A_j)-A$—2nd and succeeding operations until completion of positioning As is seen from the above formulas, it is apparent that the difference between the operations based on the absolute value instruction system and the increment instruction system is that the value to be added to the registered value CA or CI in the first arithmetic operation is whether the value B of movement of the origin or the absolute value $A_j$ of the reference point for the incremental instruction relative to the origin of detection.

Figure 4:
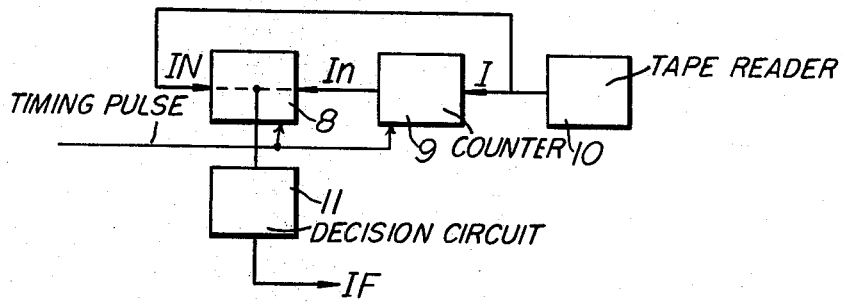
FIG. 4 is a block diagram of a comparison arithmetic operation circuit for a repetition count applied in an increment instruction system.

Referring to FIG. 4, in which a comparator circuit for repetitive count is illustrated, when an incremental instruction signal I and the number of times of repetition IN of the signal I are read by the tape reader, the signal I is counted by the repetition counter 9, and thereafter the arithmetic operation circuit 8 compares, at the time determined by a timing pulse, the instructed number of repetition IN and the count number In of the counter 9. More particularly, when the tape advances and the increment instruction signal I is read out by the tape reader 10, the counter 9 counts once, and the number of times of the count In and the instructed number of repetition IN read during the forward movement of the tape are compared in the operation circuit 8 during the movement of the tape.

If the instructed number of time of repetition IN and the number of counts In are not coincident, the tape moves backward to the position of the incremental instruction signal I, and then moves forward to be again read the instructed number of repetition IN stored thereon. This operation will be repeated until the instructed number of time of repetition IN coincides with the number of counts In, at which time the decision circuit 11 generates a signal for termination of the repetitive operation by which the tape advances to the next block. (The movement of the tape will be described in detail later.)

As described above, FIGS. 2, 3 and 4 illustrate single-function arithmetic operation circuits, respectively, which are specifically exampled.

Figure 5:
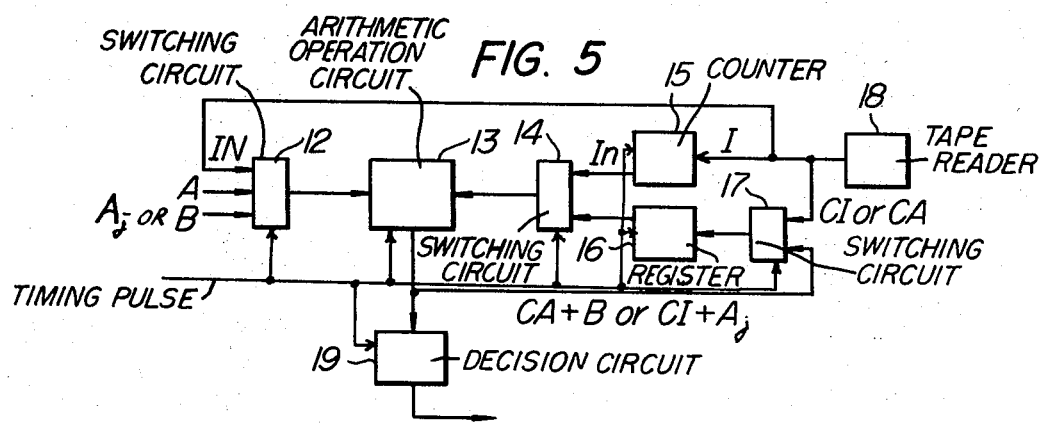
FIG. 5 is a block diagram of an arithmetic operation circuit of a combined system of an absolute value instruction and an increment instruction systems.

By unifying the circuits of FIGS. 2, 3 and 4, a position control arrangement operating according to the combination of the absolute value instruction and incremental instruction methods as shown in FIG. 5 in a block form is obtained.

Referring now to FIG. 5, the arithmetic operation is carried out on the increment instruction method over that portion of the tape on which an increment instruction signal I is stored, and on the absolute value instruction basis over the remaining portion of the tape. When an increment instruction signal I is present, the switching circuit 12 functions to provide, as an output, a signal for a detected absolute value A of the present position with respect to the origin of the detection (at this time the value of A is equal to $A_j$; namely, the value of the position of the table A is just at the position $A_j$), and when the instruction signal I is not present, the switching circuit 12 provides a signal for the amount A of the displacement of the origin. In the same manner as above, the switching circuit 14 provides, as an output, a signal representing the counted number of times of repetition In during the forward movement of the tape, and a signal representing the value stored in the register 16 at the time determined by a timing pulse during interruption of the tape movement. The output signal of the switching circuit 17 is CI or CA during the forward movement of the tape, and the output $A+B$ or $CI+A_j$ of the operation circuit 13 at the time determined by a timing pulse during suspension of the tape movement. Thus, by means of these switching circuits 12, 14 and 17, the arrangement of FIG. 5 operates in the same manner as the circuit of FIG. 4 during the forward movement of the tape, and during suspension of the tape movement, it operates in the same manner as the circuit of FIG. 3 when the incremental instruction signal I is present, and in the same manner as the circuit of FIG. 2 when the signal I is not present.

As described above, the most advantageous feature of the instant invention is to provide two modes of control by a reasonable control system which comprises a smaller number of circuit elements.

Next as a first example of tape instruction, an instruction code CR, NO12, I15, X30.00, Y, BS will now be described. CR and BS are tape stop signals. The tape stops at CR and BS. Then, if a start signal is supplied at CR, the tape moves forward, and if the start signal is supplied at BS, the tape moves backward and reverses its movement upon receipt of an increment instruction signal I. NO12 means a hole number which has no direct relation to given control. I indicates that the instruction is an increment instruction. The numeral 15 means the number of repetitions required.

I15, X30.00, Y means that an object to be controlled is moved by 30.00 millimeters in the +X axis direction and by 0 millimeter in the Y axis direction at one time, and this movement is repeated 15 times.

When the I signal is read out from the forwardly traveling tape by the tape reader 18, the switching circuits 12 and 14 switch the arrangement to the increment instruction mode and the repetition counter 15 counts one to render the number of counts In to be I1 and which is fed the arithmetic operation circuit 13. On the other hand, the instructed number of time of repetition IN which has been read out now as I15 is also fed to said arithmetic operation circuit 13 which functions this time as a comparing circuit where the values I1 and I15 are compared with each other. Since the value I1 does not coincide with the value I15, instruction for backward movement is given when the tape reaches the BS position. However, the tape does not immediately move backward but the tape moves backward when the positioning operation of this block is completed. During this process, the tape reader 18 reads out the X value of 30.00 and Y value of 0. The data read out is then fed through the switching circuit 17 to the register 16 where said data is temporarily stored. This data is fed through the switching circuit 14 to the operation circuit 13 where it is added to the value $A_j$ of the position of the reference point fed thereto through the switching circuit 12 which has been switched by the I signal; the resulting value is again fed through the switching circuit 17 to the register 16. The stored content of 16 is $CI+A$, which is maintained until the positioning operation is completed. The output value signal of the register 16, $CI+A$, is fed through said switching circuit 14 to the arithmetic operation circuit 13 where it is subtracted by the signal A supplied to the switching circuit 12 and passed to the operation circuit 13. This operation is repeated until the positioning has been completed, that is until the result of the operation becomes zero. When the result of the subtraction becomes zero and the positioning operation has been completed, the tape moves in the reverse direction upon receipt of the BS signal as previously described. The backwardly moved tape reverses its movement upon receipt of an increment instruction signal I, and moves forwardly up to the BS position so as to permit the tape reader again to read out the information stored in the tape between the positions I and BS. The counter 15 counts the repetition number each time of the appearance of the incremental instruction signal I which is produced by the repetitive movement of said tape. This operation is repeated until the counted number coincides with the instructed number of times of repetition IN. When the coincidence signal is developed by the decision circuit 19 at the tape position BS, the tape will advance further and the counter 15 is reset. The amount of movement of the object to be controlled accomplished during this time is equal to 15 times the unit amount of movement, 30.00 millimeters, in the +X direction and 15 times 0 millimeters in the Y direction, and therefore, the total amount of movement would be 450 millimeters in the +X axis direction with respect to the original position. Because of the employment of the method of forward/backward move of the tape, the register for the instructed number of times of repetition IN is unnecessary and the length of tape is made short. In this way, the provision and handling of an instruction tape can be simplified; this is the second advantageous feature of the instant invention.

As the second example of the instruction, the code

CRN013I10XY—20.00 CRXY—5.00
BSN014X—25.00Y+74.00 CR will be described. An increment instruction value I is attached to the hole number NO13, thus denoting an increment instruction, while I is not attached to the hole number NO14 which is an absolute value instruction; two modes of instruction are combined in this code. NO13 is first moved 0 millimeters in the X axis direction and by 20.00 millimeters in the —Y direction. Next it is further moved upon receipt of the CR instruction by 0 millimeters in the X axis direction and by 5.00 millimeters in the —Y axis direction with respect to the present position. Since I10 is instructed, said movement must be repeated ten times in the same manner as above. The final position would be, therefore, 250.00 millimeters away in the —Y direction with respect to the first position. After the completion of repetitive operations for the NO13 for ten times as directed, a coincidence signal will be developed by the decision circuit 19. The tape, therefore, stops the repetitive movement and advances to the N14 section. Since N14 has no increment instruction I attached to it, the operation will be carried out this time on the absolute value instruction basis and the switching circuit 12 is switched so that a signal representing the amount of displacement of the origin B can be delivered to the arithmetic operation circuit 13, and the switching circuit 14 is switched so as to provide a connection to the register 16. An instruction for the movement of 25.00 millimeters in the —X direction and 74.00 millimeters in the +Y direction is fed through the switching circuit 17, register 16 and switching circuit 14 to the arithmetic operation circuit 13, where this instruction value is added to the origin movement value B. The result of the addition is applied through the switching circuit 17 to the register 16 where it is stored. The stored result is supplied through the switching circuit to the arithmetic operation circuit 13, and the subtraction is carried out between said result and the detected absolute value A of the present position from the origin. This operation is repeated until the difference becomes zero.

Figure 6:
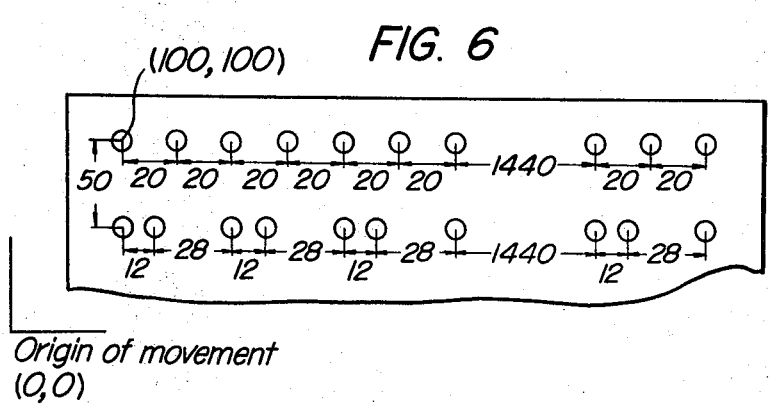
FIG. 6 is a diagram for explaining the positioning control according to the instant invention.

Referring now to FIG. 6 which illustrates an embodiment of actual positioning control according to the instant invention and FIG. 7 which shows a program sheet provided for the positioning control of FIG. 6, NOO1 denotes a movement of 100.00 millimeters in the +X axis direction and 100.00 millimeters in the +Y axis direction with respect to the origin of the movement; said operation is carried out on the absolute value instruction formula. Next instruction NOO2 means that an increment instruction for movement of 20.00 millimeters in the +X axis direction and 0 millimeters in the Y axis direction with respect to the point positioned by the instruction NOO1, repeating this operation 80 times. The third instruction NOO3 indicates a further movement of 100.00 millimeters in the +X axis direction and 50.00 millimeters in the +Y axis direction with respect to the origin of movement on the absolute value instruction basis. The last part of the instruction exampled is NOO4 which denotes further movements carried out on the increment instruction basis by amounts of 12.00 millimeters in the +X axis direction and 0 millimeters in the Y axis direction, then 28.00 millimeters in the +X axis direction and 0 millimeters in the Y axis directon, repeating the movements 40 times.

Although there have been described a preferred embodiment the arithmetic operation circuit and method of instruction as well as an actual example of the positioning control according to the instant invention, many modifications in the way of combining both types of instruction systems will now be apparent to those skilled in the art; for example, the operational expressions may be:

$CI-(A-A_j)$—for an increment instruction system, and
$CA-(A-B)$—for an absolute value instruction system.

Or the expressions also may be as follows:

$(CI+A_j)-A$—for an increment instruction system, and
$CA-(A-B)$—for an absolute value instruction system.

As described above, it is possible, according to the present invention, to simplify the structure of the device since the arithmetic circuit simultaneously serves as a register. In addition, the present invention has the advantage that, since a value of absolute value instruction CA, a value of increment instruction CI and an increment instruction signal I are stored in an instruction tape, and the device is automatically switched to the absolute instruction system or to the increment instruction system depending upon the presence or absence of the increment instruction signal I, preparation and handling of the instruction tape are rendered simple as compared with the conventional devices in which the control system is restricted to either one of the absolute value instruction system and increment instruction system. Still another advantage of the device of the invention is that the length of the instruction tape can be shortened remarkably as compared with those for the conventional systems, because the operation is carried out repeatedly on the instruction system.

What is claimed is:

1. A numerical control apparatus for controlling the position of an object, said apparatus comprising reading means (18) for reading instruction from an instruction tape; counter means (15) for counting the executed number of times of instruction; first switching means (12) for selecting either the instructed number of times of repetition of said instruction or the coordinates of said object to be controlled; second switching means (17) for selecting either one of instruction for repetition and instruction for displacement; arithmetic and comparison means (13) for carrying out an arithmetic operation between instructed values and comparing said instructed number of times of repetition and said executed number of times of said instruction; register means (16) for storing said instructed values and the result of said arithmetic operation carried out by said arithmetic and comparison means (13); third switching means (14) for selecting either the contents of said register means (16) or the count of said executed number of times of said instruction; and a decision circuit (19) for providing a signal of termination of repetition when said executed number of times of said instruction coincides with said instructed number of times of repetition.

References Cited

UNITED STATES PATENTS

| | | |
|---|---|---|
| 3,244,019 | 4/1966 | Weber. |
| 3,303,332 | 2/1967 | Gotz _____ 235—151.11 |
| 3,365,634 | 1/1968 | Centner et al. __ 235—151.11 X |
| 3,372,568 | 3/1968 | Cemelson _____ 235—151.11 X |

EUGENE G. BOTZ, Primary Examiner

J. F. RUGGIERO, Assistant Examiner

U.S. Cl. X.R.

235—150.4, 61.6